US010168057B2

(12) United States Patent
Goldsworthy et al.

(10) Patent No.: US 10,168,057 B2
(45) Date of Patent: Jan. 1, 2019

(54) METHOD AND APPARATUS FOR CONTROLLING MOISTURE

(71) Applicant: Commonwealth Scientific and Industrial Research Organisation, Campbell (AU)

(72) Inventors: Mark Goldsworthy, Mayfield (AU); Stephen White, Mayfield (AU); Ganapathisubbu Sethuvenkatraman, Mayfield (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 44 days.

(21) Appl. No.: 15/301,782

(22) PCT Filed: Apr. 2, 2015

(86) PCT No.: PCT/AU2015/000202
§ 371 (c)(1),
(2) Date: Oct. 4, 2016

(87) PCT Pub. No.: WO2015/149117
PCT Pub. Date: Oct. 8, 2015

(65) Prior Publication Data
US 2017/0115016 A1    Apr. 27, 2017

(30) Foreign Application Priority Data
Apr. 4, 2014   (AU) ................................ 2014901227

(51) Int. Cl.
*B01D 53/06* (2006.01)
*F24F 3/14* (2006.01)
*B01D 53/26* (2006.01)

(52) U.S. Cl.
CPC ............ *F24F 3/1423* (2013.01); *B01D 53/06* (2013.01); *B01D 53/261* (2013.01);
(Continued)

(58) Field of Classification Search
CPC .................. B01D 53/06; B01D 53/261; B01D 2253/108; F24F 3/1423; F24F 2003/1464; F24F 2203/1032
(Continued)

(56) References Cited

U.S. PATENT DOCUMENTS 4,409,006 A * 10/1983 Mattia .................... B01D 53/06
                                                             95/113
5,176,005 A    1/1993 Kaplan
(Continued)

OTHER PUBLICATIONS

International Search Report and Written Opinion for Application No. PCT/AU2015/000202, dated May 4, 2015.

*Primary Examiner* — Frank M Lawrence, Jr.
(74) *Attorney, Agent, or Firm* — Womble Bond Dickinson (US) LLP; John J. Penny, Jr.

(57) ABSTRACT

A method and system for controlling moisture content of a gaseous flow. A pair of desiccant contact structures each provided with a process adapted to pass through a process gaseous stream to altering the moisture content of the gaseous stream. Each desiccant contact structure also has a regeneration side adapted to pass through a regeneration gaseous stream for altering the moisture content of a desiccant in the contact structure. The process side of a first desiccant contact structure is fluidly connected to the regeneration side of a second desiccant contact structure via a first closed recirculation loop. In an alternative embodiment a second closed recirculation loop may also be provided on the regeneration side of the first desiccant contact structure. Gaseous flow is then provided to the process side of the second desiccant contact structure to thereby control its moisture.

19 Claims, 4 Drawing Sheets

(52) U.S. Cl.
CPC ............ *B01D 2253/108* (2013.01); *F24F 2003/1464* (2013.01); *F24F 2203/1032* (2013.01)

(58) Field of Classification Search
USPC .... 95/107, 113, 119, 121–123; 96/131, 125; 34/80, 472, 473
See application file for complete search history.

(56) References Cited

U.S. PATENT DOCUMENTS

| | | | |
|---|---|---|---|
| 5,564,281 A | 10/1996 | Calton et al. | |
| 5,695,546 A * | 12/1997 | Izumi | B01D 53/06 95/113 |
| 6,334,316 B1 * | 1/2002 | Maeda | B01D 53/261 62/271 |
| 7,217,313 B2 * | 5/2007 | Motono | B01D 53/06 95/113 |
| 8,500,886 B2 * | 8/2013 | Okano | B01D 53/06 95/113 |
| 8,764,882 B2 * | 7/2014 | Kametani | B01D 53/06 95/113 |
| 2005/0235827 A1 | 10/2005 | Dinnage et al. | |
| 2009/0139254 A1 * | 6/2009 | Landry | B01D 5/0033 62/271 |

\* cited by examiner

METHOD AND APPARATUS FOR CONTROLLING MOISTURE

Priority is claimed under 35 U.S.C. § 119 to Australian Application No. 2014901227 filed on Apr. 4, 2014 and under 35 U.S.C. § 365 to PCT/AU2015/000202 filed on Apr. 2, 2015.

TECHNICAL FIELD

The present invention relates to a method and apparatus for controlling the moisture content of a gaseous flow and in particular but not only high efficiency moisture removal for cooling systems such as comfort air conditioning.

BACKGROUND ART

There are various mechanisms and methods for controlling moisture content of gaseous flow in air conditioning systems or other applications. One of the most popular and successful designs uses solid desiccant contact structures such as desiccant rotors or wheels. These desiccant wheels essentially comprise a honeycomb-type structure which are adapted to cycle through different gaseous flows. The desiccant contained on the structure adsorbs moisture from one gaseous flow (process side) and/or releases moisture contained in the desiccant to a gaseous flow (regeneration side), to regenerate the desiccant for future use.

In air conditioning systems, where both drying and cooling of the air are priorities, energy efficiency is extremely important. Normally, solid desiccant structures are open cycle systems in which the regeneration stream receives external heat energy input and is then discharged to the atmosphere after recovering moisture from the wheel, i.e. regenerating the desiccant. This results in a significant loss of heat in the regeneration stream/side, particularly if high temperature regeneration is used.

Closed loop systems in conjunction with desiccant contact structures have been proposed. U.S. Pat. No. 6,029,467 to Moratalla discloses a method and apparatus for conditioning air using a simple single desiccant wheel system. A first flow of air to be dehumidified passes through the desiccant wheel on the process side. A second flow of air, isolated from said first flow, passes through the regeneration side in a closed loop arrangement. A plurality of temperature changes are provided in the closed loop, via condensers or heaters for instance, to cool the air to below its dew point, remove the resultant moisture and then reheat the dried air so that it is in a suitable condition for regenerating the desiccant.

Similarly, U.S. patent. application Ser. No. 2009/0139254 describes a closed recirculation loop on at least the regeneration side of a desiccant wheel. Like U.S. Pat. No. 6,029,467, however, the regeneration stream needs to be cooled to below its dew point resulting in significant additional heat loss. This heat loss is exacerbated by an additional energy requirement to reheat the air back to the desired regeneration temperature for contact with the desiccant wheel, thereby negating any benefit of operating in a closed loop configuration.

Another variation of the closed loop regeneration site is disclosed in International Pat. Application No. PCT/NL2007/050495 (Publication No. WO 2008/044932). In this document, the process of regenerating the desiccant by means of superheated steam is disclosed. Again, however, this is for a single simple desiccant wheel system for drying food. There is no suggestion regarding whether the disclosed method and system would be suitable multiple desiccant structures or for air conditioning systems. The process develops a dried gaseous stream at an elevated temperature. Such an elevated temperature airstream supply is impractical for use in air conditioning systems in which the intent is to provide an air supply which is cooler and dryer than the ambient or conditioned space.

In large installations, of course, where the volume of gas/air flows and energy requirements are high, multiple desiccant wheels may be required. However, there is little research conducted in regard to multiple desiccant system in arrangements other than parallel, i.e. each desiccant contact structure/rotor operating independently. The applicant believes there are significant advantages available in arrangements and systems for multiple desiccant contact structures to provide reliable service particularly in air conditioning systems but also produce significant efficiencies in energy usage.

An example of a desiccant cycle with a pair of desiccant structures are disclosed in the U.S. Pat. No. 5,176,005. In that system, two desiccant contract structures are used with regeneration air for the second structure sourced from the secondary outlet of an indirect evaporative cooler to air in minimising the heat lost to ambient. However, after reheating and passage through the second desiccant structure this air stream, the heat energy contained within it, is subsequently lost to the ambient. This energy loss is common in open loop based desiccant based cycles, even when methods to recover heat are employed.

Use of condensation heat from vapour compression cycles to augment the regeneration heat of a desiccant system has been pursued in various inventions. For example, U.S. Pat. No. 5,564,281 describes a two coil condenser arrangement in the regeneration stream of a desiccant system for improved heat transfer. The recovery of the latent heat of condensation contained within humid air may of course be achieved by using a condenser coil supplied with an external source of coolant to cool the humid air below the dew point temperature. However, this requires energy input to keep the coolant below the dew-point temperature and so negates most or all of the benefit from recovering the heat of condensation.

Any discussion of the prior art throughout the specification should in no way be considered as an admission that such prior art is widely known or forms part of common general knowledge in the field.

DISCLOSURE OF THE INVENTION

It is an object of the present invention to overcome or ameliorate at least one of the disadvantages of the prior art, or to provide a useful alternative.

In a first aspect, the present invention provides a method for controlling moisture content of a gaseous flow comprising:

providing a pair of desiccant contact structures each desiccant contact structure having a process side adapted to pass through a process gaseous stream for altering moisture content of the gaseous stream, and a regeneration side adapted to pass through a regeneration gaseous stream for altering moisture content of a desiccant in said contact structure, wherein the process side of a first desiccant contact structure is fluidly connected to the regeneration side of a second desiccant contact structure with a first closed recirculation loop, or the regeneration side of the first desiccant contract structure is provided with a second closed recirculation loop, said gaseous flow being provided to the process side of the second desiccant contact structure to thereby control its moisture content.

In a second aspect, the present invention provides an apparatus for controlling moisture content of a gaseous flow comprising a pair of desiccant contact structures, each desiccant contact structure having a process side adapted to pass through a process gaseous stream for altering moisture content of the gaseous stream, and a regeneration side adapted to pass through a regeneration gaseous stream for altering moisture content of a desiccant in said contact structures, comprising a first closed recirculation loop to provide a fluid connection between the process side of a first desiccant contact structure to the regeneration side of a second desiccant contact structure, or a second closed recirculation loop to provide fluid to the regeneration side of the first desiccant contract structure wherein said gaseous flow may be applied to the process side of the second desiccant contact structure to control its moisture content.

In a third aspect, the present invention provides a solid desiccant system for controlling moisture in a gaseous flow comprising first and second desiccant structures, each desiccant structure having a process side for contact with a process gas stream to alter the moisture content of said gas stream, and a regeneration side to control moisture content of the desiccant, wherein the fluid communication between the process side of the first desiccant structure and the regeneration side of the second desiccant structure is provided by a first closed fluid recirculation loop in which fluid leaving the regeneration side of the second desiccant structure is provided to the process side of the first desiccant structure, or fluid to the regeneration side of the first desiccant contract structure is provided by a second closed recirculation loop.

In a preferred embodiment, the method, apparatus for system may incorporate either of the first closed recirculation loop or second closed recirculation loop separately, and in yet another embodiment both the first recirculation loop and second recirculation loop are incorporated.

In yet another embodiment the second closed recirculation loop is thermodynamically coupled to the regeneration side of the second desiccant contact structure.

In a preferred embodiment, the desiccant contact structures can be provided by one or more desiccant rotors or wheels.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

So that the present invention may be more clearly understood, it will now be described by way of example only with reference to the accompanying drawings in which.

BEST MODE FOR CARRYING OUT THE INVENTION

Figure 1:
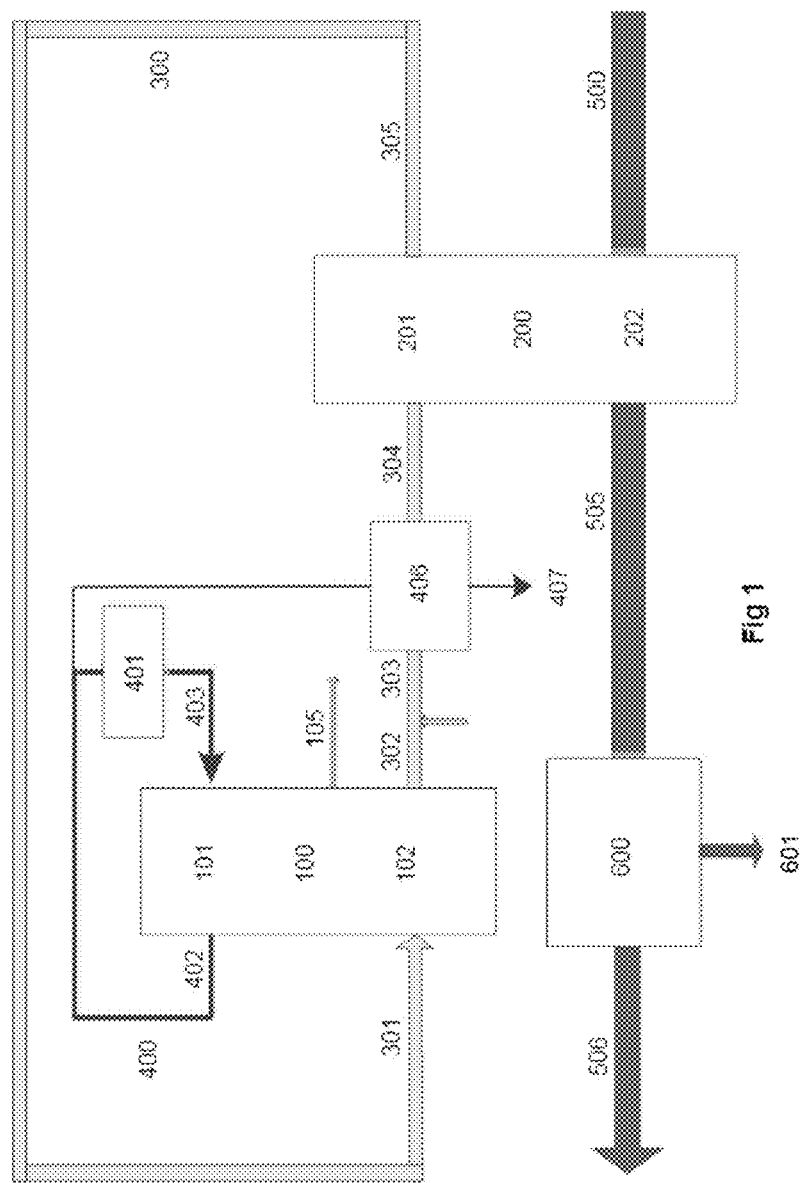
FIG. 1 is a diagram of a moisture content control system in accordance with a first embodiment of the present invention.

FIG. 1 is a flow chart of a moisture content control system utilising two desiccant contact structures 100, 200. In this embodiment and in the following discussion these desiccant contact structures will be referred to a desiccant rotors or wheels. However, it will be clear to a person skilled in the art that other desiccant contact structures which provide intimate contact between a gaseous flow and a solid desiccant may be used.

It will also be clear to a person skilled in the art that in the embodiments shown, two desiccant rotors/wheels are provided. In certain embodiments, the desiccant contact structures other than rotors or wheels may be used. The applicants also envisage that the arrangement and fluid connections between the desiccant rotors 100, 200 could extend to multiple connections between multiple desiccant rotors or wheels.

Each desiccant rotor 100, 200 has a respective regeneration side 101, 201 and a process side 102, 202.

The regeneration side is intended to "regenerate" the solid desiccant on the rotor as it rotates. Generally, regeneration of the solid desiccant is accomplished by providing heated dried gaseous flow to the desiccant such that it releases the adsorbed moisture to the regeneration stream.

On the process side, as will be known to a person skilled in the art, the desiccant contacts an incoming moist gas/air flow as it rotates. This "fresh" desiccant contacts the incoming moist gas/air and reduces/dehumidifies the incoming gas/air by means of adsorption.

Again, as noted by a person skilled in the art, these desiccant rotors 100, 200 are generally arranged for cyclic movement between the regeneration side/stream and process side/stream.

In the present arrangement, the desiccant rotors 100, 200 are fluidly connected such that the process side 102 of a first desiccant rotor 100 is fluidly connected to the regeneration side 201 of a second desiccant wheel 200. In the embodiment shown, this fluid connection is provided by a closed gaseous recirculation loop 300. In this loop, moist air 301 enters the process side 102 of the first desiccant rotor 100. Relatively dry air 302/303 leaves the process side 102 of the first desiccant rotor 100. After optional reheating 306, the regeneration stream 304 enters the regeneration side 201 of the second desiccant rotor 200. This in turn regenerates the desiccant held in the second desiccant wheel 200. The resultant moist air 305 leaving the regeneration side 201 is then recirculated back to the process side 102 of the first desiccant wheel as stream 301.

This arrangement of the closed loop 300 provides significant efficiency gain over the prior art. In most instances in the prior art, which the applicant is aware, open loop on the regeneration side is used, resulting in significant energy loss.

This process is quite efficient since, unlike the prior art, the incoming gaseous/air flow 304 to the regeneration side 201 of the desiccant rotor 200 does not necessarily have to undergo a cooling/condensation step followed by reheating. It is already relatively dry and at an elevated temperature. As mentioned above, the conventional cooling step followed by condensation in order to dry to air, and then further reheating is quite wasteful from an energy perspective.

The primary process air stream 500 which is to be dried and cooled, enters the process side 202 of the second desiccant wheel 200. It will be recognised that this incoming air 500 may be fresh air or, in an alternative embodiment, include recirculated air from an air conditioned space. After passing through the regeneration side 201 where the desiccant is regenerated by means of incoming regeneration stream 302, the desiccant then passes through and contacts incoming stream 500 to reduce the moisture content of the gas/air stream and produce a dehumidified or moisture-reduced air flow 505. This air flow can then be used directly for various processes known in the art.

In the embodiment shown, direct or indirect air coolers 600 can be used to further cool air flow 505 and thereby provide a cool dry air stream 506 suitable for various uses including comfort air conditioning. Exhaust air stream 601 from cooler 600 may be vented to the atmosphere.

The elegant and efficient closed fluid loop connection between the first desiccant rotor 100 and second desiccant rotor 200 allows the second desiccant rotor 200 to be regenerated without the need for additional and separate heat input, while still efficiently and consistently producing a cool dry gas/air outlet 505/506 on the process side 202.

In the embodiments shown, it is preferred that the first desiccant rotor 100 is at a relatively high temperature and the second desiccant rotor 200 at a relatively low temperature. Typically, the high temperature desiccant rotor 100 in between a 100-180° C. and the low temperature stage is 50-70° C.

As regards regeneration of the high temperature rotor 100, in the embodiments shown, regeneration is accomplished via a closed recirculation loop 400. The fluid in the closed recirculation loop is preferably superheated steam, and atmospheric pressure. In this closed recirculation loop 400, a heat source 401 is provided. Superheated steam 402 leaving the regeneration side 101 passes through heat source 401 and its temperature is elevated. Superheated steam 403 leaving the heat source 401 passes to and regenerates the solid desiccant on the desiccant wheel 100. The superheated steam 402 then leaves the regeneration side 101. The superheated steam 402/403 on the regeneration site 101 preferably, but not essentially, flows in a countercurrent direction to the air stream 301/302 on the process side 102. Part of this superheated steam may be diverted 405 to a condenser 406 for efficient and optional heating of the air 302/303 leaving the process side 102 of the first desiccant wheel. In this condenser 406 the superheated steam exchanges energy with incoming air flow 303 to produce condensate 407, while the regeneration dry air stream 302/303 is heated to produce heated dry air stream 304 entering the regeneration side 201 of the second desiccant wheel 200.

The arrangement shown in FIG. 1 reduces waste heat since unlike the prior art there is no open regeneration loop. While the two nested closed recirculation loops 300-400 may be more complex to operate, the embodiment in FIG. 1 provides a lower pressure drop meaning less fan power consumption.

It will be clear to persons skilled in the art that various other modifications and improvements can be made to this system while still retaining the fluid connection between the desiccant rotors and thereby the process and energy efficiency arising from the present invention.

For instance, it will also be appreciated that such fluid connection of the desiccant rotors could extend to multiple rotors in a cascade, or separate groups of two or more rotors, providing a combined cooling/drying effect. In one example, further mirrored sets of desiccant rotors could run in parallel to rotors 100, 200 with the incoming air stream 500 being split to pass through the process side of the respective low temperature wheel 200 of both sets of rotors, the resultant cooled/dried air streams being used separately or combined downstream.

Figure 2:
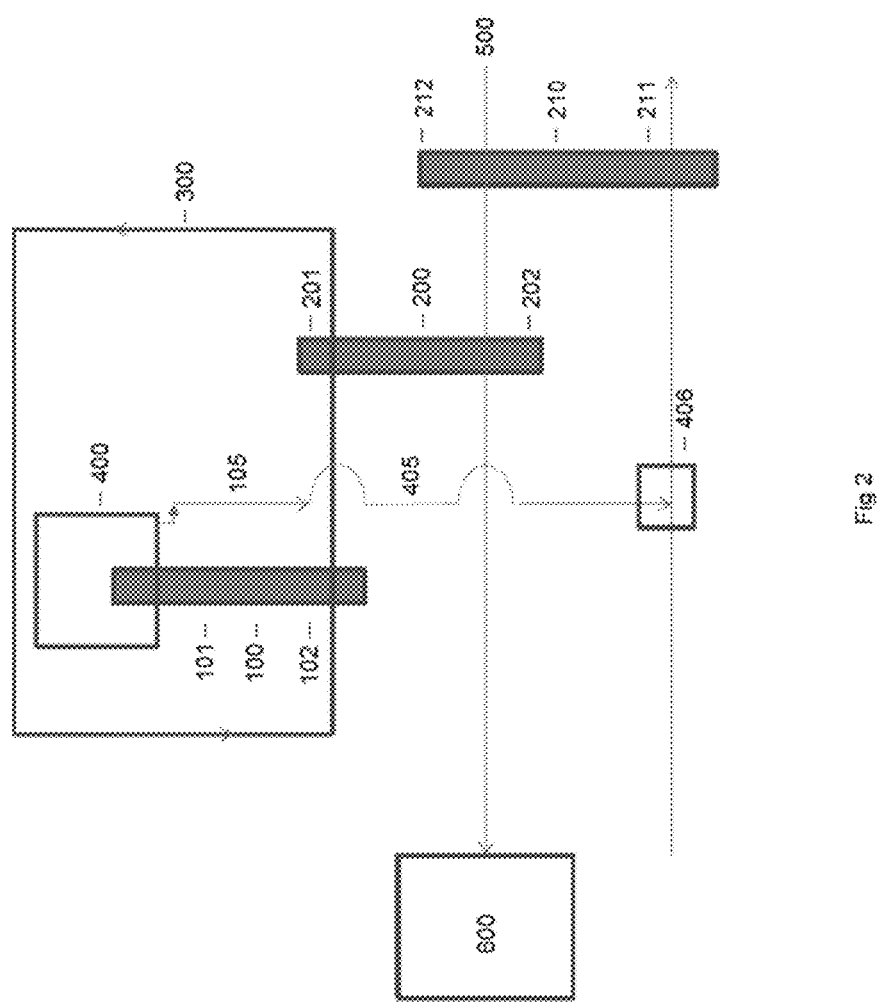
FIG. 2 is a diagram of a moisture content control system in accordance with a second embodiment of the present invention.

The embodiment shown in FIG. 2 provides a pair of desiccant wheels 200 and 210 on the low temperature side of the device with respective regeneration sides 201, 211 and process sides 202,212. A single high temperature desiccant wheel 100 is provided. The process side 102 of the high temperature wheel 100 is again fluidly connected to the regeneration side 201 of the desiccant wheel 200 by means of a closed loop 300. As with FIG. 1, a closed steam recirculation loop 400 is provided on the regeneration side 101 of the first desiccant wheel 100. The purge stream 105 and/or steam diversion stream 405 condensate 406 coming from closed loop 400 is passed to the regeneration side 211 of the desiccant wheel 210. The process stream 500 then passes through to process sides of two desiccant wheels 200, 210. This allows increased moisture removal from the process stream.

FIG. 2 is a significant improvement over the embodiment of FIG. 1 since the process air 500 passes through the process side 212 and 202 of both low temperature desiccant wheels 200, 210. In FIG. 1, the process air only passes through one desiccant wheel and therefore may not be sufficiently dried. The high moisture removal provided by the embodiment of FIG. 2 results lower indoor temperatures due to better IEC performance. The aforementioned advantages of the two nested closed recirculation loops 300, 400 still arise in the embodiment of FIG. 2 but the second low temperature desiccant wheel 210 is open loop and may result in some wasted heat. The additional bulk of three desiccant wheels is offset by the improved performance.

Figure 3:
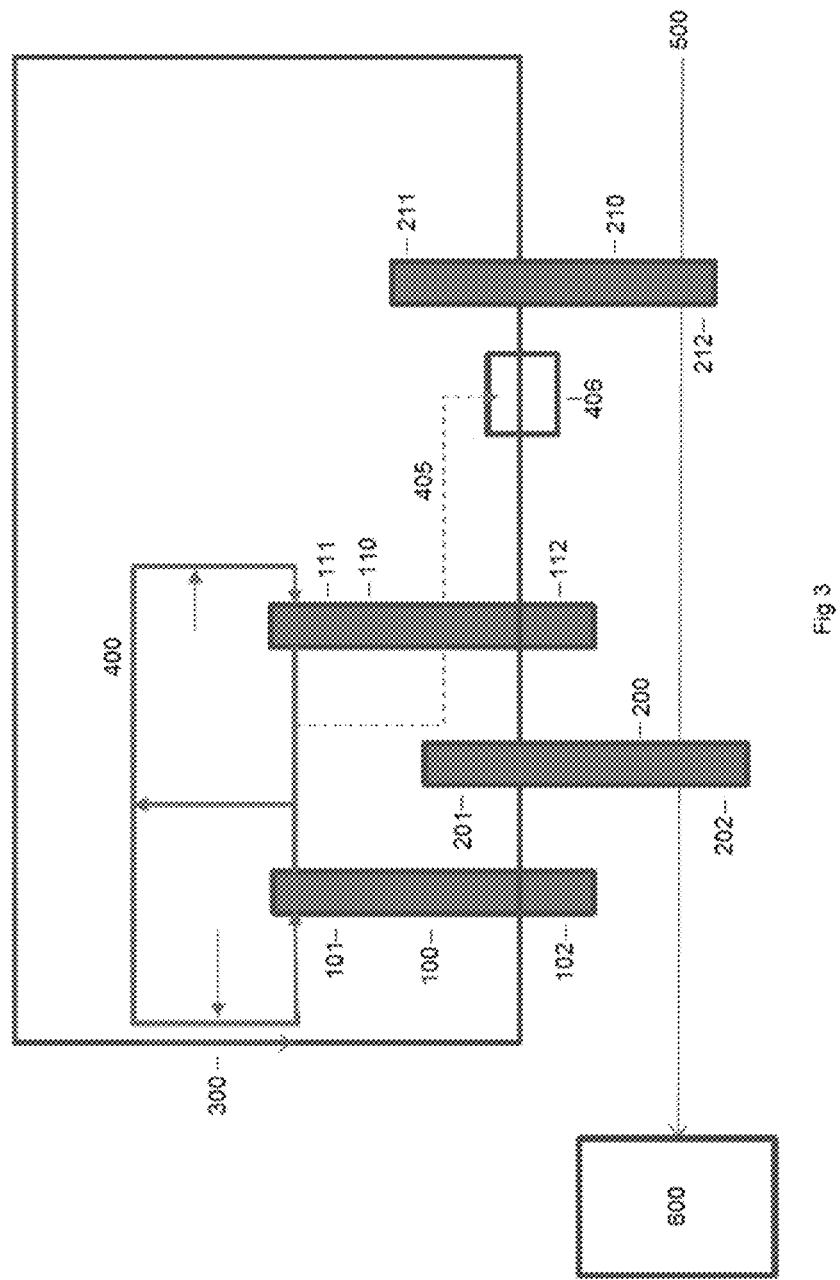
FIG. 3 is a diagram of a moisture content control system in accordance with a third embodiment of the present invention.

FIG. 3 shows another embodiment where two desiccant wheels 100, 110 are provided on the high temperature side as well as two desiccant wheels 200, 210 on a lower temperature side. Unlike the cascade arrangement provided in FIG. 2, FIG. 3 has two low temperature desiccant wheels in series with process air 500 passing through both sides 212, 202. Again, this system had a closed recirculation loop 300 between the respective process sides 101, 111 of the high temperature desiccant wheels 100, 110 and the regeneration sides 201, 211 of the desiccant wheels 200, 210 on the low temperature side. As with embodiments shown in FIG. 1 and FIG. 2, each of the desiccant wheels 100, 110 on the high temperature side have a closed steam recirculation loop on their regeneration side.

Again, a condensate from the regeneration loop 400 on the high temperature desiccant wheel is passed to heat exchanger 406 to heat steam passing through the regeneration side 201, 211 of the low temperature desiccant wheels.

FIG. 3 provides higher moisture removal than FIG. 1 since again process air flow 500 passes through two desiccant wheels and hence produces lower indoor temperatures. Again, there is minimal wasted heat as there is no open regeneration loop. All regeneration is via closed recirculation loops 300 and 400. Again, the additional bulk and complexity of four desiccant wheels may result in higher pressure drops/electrical consumption and system complexity but this is more than offset by the improved performance.

Among the advantages arising from the present invention is that less heat is required by the system as compared with standard single desiccant wheels or open loop systems, for the same amount of moisture removal. The applicants believe energy reduction in the order of 50% may be obtained by the dual rotor/closed loop system of the present invention as compared with conventional single stage systems.

The dual closed loop configuration 300, 400 ensures that the majority of the regeneration heat is retained within this system. In other words, less heat input is required for the regeneration side 201 of the desiccant wheel 200 which is the primary moisture controller contact structure for incoming moist air 500.

Further, in the second closed loop reconfiguration 400 (for regeneration of the first desiccant wheel 100) the desorption ability of steam is not impacted by addition of moisture from the wheel as is the case for conventional systems where drying/regeneration uses moist air. As will be known to persons skilled in the art, when moist air is used to dry a surface the rate of drying is limited by the rate of diffusion of the moisture from the air near the surface to the bulk air (assuming the surface remains moist). When regenerating the desiccant using superheated steam, however, the moisture does not need to diffuse as such. The diffusion happens almost instantly e.g. at the speed of sound. The drying rate is only limited by how fast heat can be supplied to the desiccant surface to keep it at the saturation temperature. Therefore it will be appreciated that if the steam is hot enough, the drying rate will be faster in steam that it will be in moist air. Accordingly, using superheated steam as the "regenerative" fluid will under certain conditions, improve the rate of drying i.e. regeneration of the desiccant and so leads to a more efficient operation, i.e. more moisture transfer for a given amount of heat transfer.

In this regard unless a mechanism is provided to remove moisture from the high temperature recirculation loop on a continuous basis, this loop may get saturated with moisture and hence will result in condensation. This invention provides a solution to this problem by providing another wheel that allows transfer of moisture from the recirculation loop. By utilising steam and the regenerations stream fluid for the high temperature wheel, this invention also provides a means to recover latent heat of condensation from the moisture removed from the process air.

As mentioned above, the heat desorption can also be recovered by condensing the steam 405 via a condenser 406 and thereby elevating the temperature of regenerative air stream 302/303. Again this leads to less additional heat input for a given quantity of cool dry air production 506.

The present invention is suitable for a range of uses but particularly air cooling, eg. air conditioning in domestic or commercial buildings, and providing low humidity air streams such as industrial drying, cleaning rooms or hospitals, etc. Various suitable materials may be used on the desiccant contact structures 100, 200. Choice of the desiccant will be based on moisture removal behaviour of the desiccant materials as a function of temperature and vapour pressure. Zeolite materials and silica gel are particularly preferred. For the high temperature desiccant rotor 100, Zeolite material may be chosen since these are more suitable for higher temperature applications. The low temperature desiccant wheel may use silica gel or polymer or Zeolite.

In still another embodiment, the high temperature desiccant wheel 100 may also include a purge section/element 105. To explain, as the first desiccant wheel 100 which is at a relatively high temperature rotates from the process side 102 (where moisture is added) to the regeneration side (where moisture is removed) some of the steam/moisture in contact with the wheel is likely to condense due to the lower wheel temperature. Additionally, the initial stream of air 301 contacting the desiccant immediately after exiting the steam/regeneration side 101 may in fact remove some moisture from the wheel, rather than picking up moisture. The purge section lowers the average temperature and moisture content of process air.

Similarly, the wheel is likely to carry some moisture and heat from the regeneration side to the process side. To minimise these effects, purge sections elements 105 can be provided in the system to remove such moisture. Purge sections may also be provided for second wheel 200 if desired.

In yet a further embodiment this purge stream 105 may be fluidly connected to the closed stream recirculation loop 400 slightly upstream of 405 but after the fluid leaves the regeneration side 101. In such a case, the fluid of the closed recirculation loop 400 will no longer be superheated steam but rather moist air. Such an arrangement will typically lower the temperature range in the closed steam loop 400. With super heated steam, the temperature at desiccant wheel 100/110 on the regeneration side would be 130-180° C. With moist air as the recirculation fluid, the temperature at the desiccant wheel on the regeneration side would be around 100-150° C.

Shown below and marked Table 1 are typical temperature and humidity values of the various streams in the device shown in FIG. 1.

| Stream | T (° C.) | HR (g/kg) | Stream | T (° C.) | HR (g/kg) |
| --- | --- | --- | --- | --- | --- |
| 301 | 44.5 | 22.6 | 403 | 150.0 | — |
| 302 | 67.2 | 17.5 | 402 | 103.2 | — |
| 105 | 128.4 | 57.2 | 500 | 35.0 | 14.0 |
| 303 | 65.6 | 17.3 | 505 | 44.5 | 12.0 |
| 304 | 71.6 | 17.3 | 506 | 23.9 | 12.0 |
| 305 | 44.5 | 22.6 | | | |

The applicants have determined that the coefficient of performance (COP) of the proposed multiple desiccant rotor system is significantly higher than conventional single desiccant systems. Key performance parameters include $COPe=14.6$, $COPt=1.3$ and $Q=20.3$ kw/m$^2$ at the face area of the low temperature desiccant rotor 200. A purge section 105 may also be applied to the second desiccant wheel 200.

Conventional single desiccant rotor systems with the same conditions provide a COPt of around 0.95. More realistic values in the field are COPt =0.5 -0.7. Remarkably, it is envisaged the system proposed by the applicant would need significantly less heat to provide the same amount of cooling. This result will clearly have significant impacts on energy efficiency and costs.

The applicant again emphasises that as far as they are aware there are no two stage desiccant contact structures/rotors currently available. Other "two stage" desiccant systems are not true two stage systems since the desiccant rotors work independently of each other, eg. in parallel, and require separate inputs for heat etc.

The present invention, on the other hand, only requires one heat input, i.e. heat source 401, and the heat is used on multiple occasions via a dual closed loop recirculation system. The heat is used once on the high temperature desiccant rotor/wheel 100 to regenerate the desiccant, i.e. remove/evaporate moisture at regeneration side 101. The heat is then recovered by means of condenser 406 and used to heat the air 304 which is provided to the regeneration side 201 of the second desiccant wheel 200.

No other prior art of which the applicant is aware discloses such a multiple desiccant contact system with the fluid connection and multiple thermodynamic stages defined above.

Indeed, in the abovementioned examples where there are multiple cascades of desiccant rotors or mirrored sets, a single heat input maybe all that is required since there is minimal loss/wastage of heat on the regeneration side 201 of the primary process desiccant rotor 200.

Figure 4:
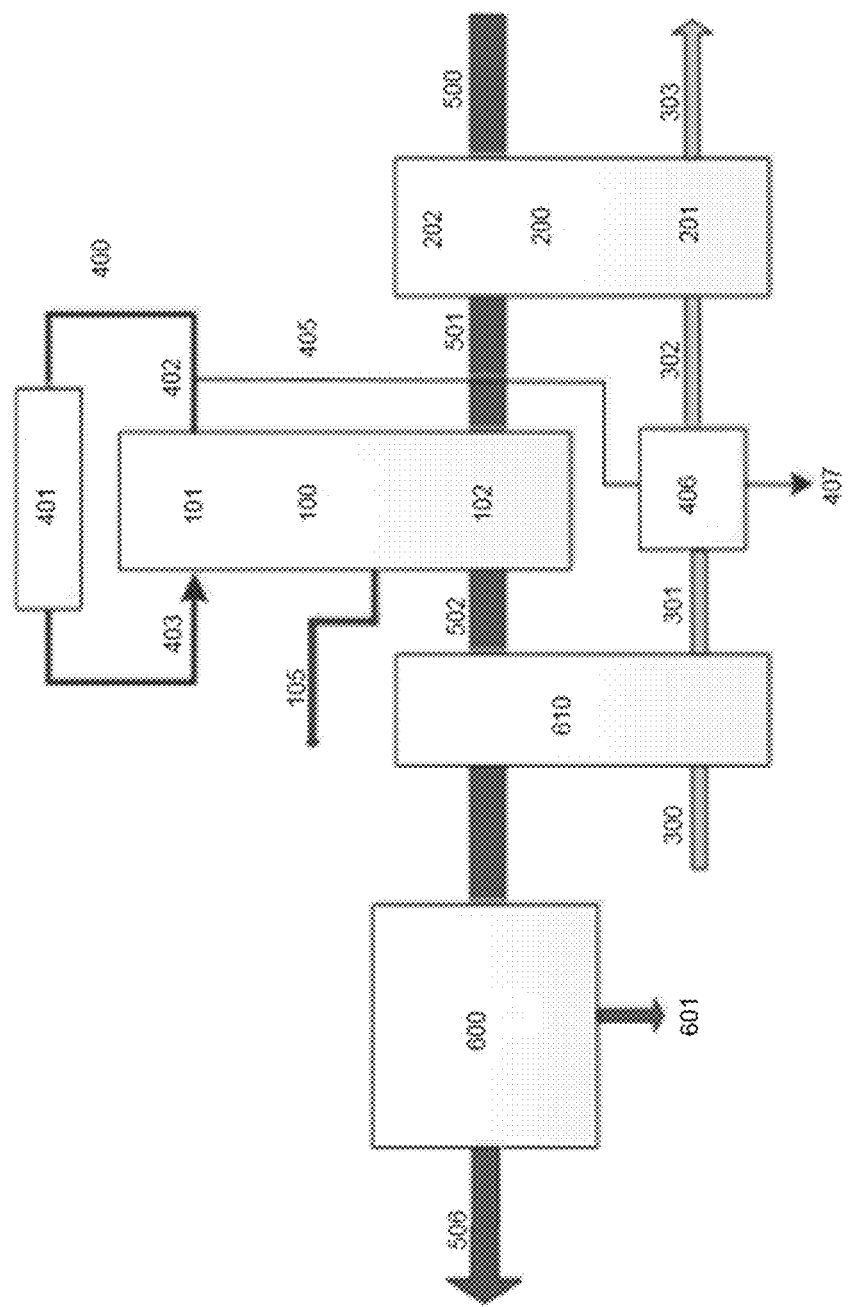
FIG. 4 is a diagram of a moisture content control system in accordance with a fourth embodiment of the present invention.

In a further alternative embodiment shown in FIG. 4 the system provides a first desiccant wheel 100 at a first relatively high temperature and a second desiccant wheel 200. At a relatively low temperature, moist warm air 500 enters the process side 202 of the low temperature desiccant wheel 200, exiting as stream 501 at a reduced moisture content via its contact with the desiccant. Stream 501 then proceeds to enter the process side 102 of the first desiccant wheel 100, thereby undergoing further moisture reduction and exiting as stream 502.

As shown in FIG. 4, stream 502 may optionally pass through heat exchanger 610 and air cooler 600 to further cool the stream and produce cooled dry air stream 506.

As with the embodiments shown in FIGS. 1-3, the regeneration side 101 of the high temperature desiccant wheel 100 is subjected to a closed fluid recirculation loop 400. Similar to the embodiment shown in FIG. 1, the stream 402 leaves the regeneration side 102 as superheated steam and passes through heat source 401. The resultant superheated steam 403 returns to the regeneration side 101 for regeneration of a desiccant on the desiccant wheel 100. The superheated steam 402 leaving the regeneration side 101 may be partially diverted to stream 405 and condenser 406 for efficient heating of the regeneration air stream 302 entering the regeneration side 201 of the second desiccant wheel 200.

This regeneration stream 302 is produced by gas/air stream 300 passing through heat exchanger 610 to form heated air stream 301. This heated air stream 301 may undergo further heating via condenser 406 to become heated regeneration air stream 302 for entry into the regeneration side 201 for regeneration of the desiccant.

The resultant stream 303 leaving the regeneration side will have a moisture content higher than stream 302 by virtue of the moisture released from the desiccant, in much the same way as the embodiments shown in FIGS. 1-3.

As with the earlier embodiments, by providing a closed loop configuration 400 on the regeneration side of the desiccant wheel, significant energy savings are realised. As discussed above the embodiment shown in FIG. 4 has only one external heat input via heat source 401. This energy/heat input is applied to both regeneration sides 101/202 of the first and second desiccant rotors 100,200. The heat input applied by source 401 heats streams 402/301 to provide heated regeneration streams 403/302 respectively.

The temperature range on the regeneration side of the second desiccant wheels 200/210 varies between the embodiments of FIGS. 1 and 3, which comprise both first and second recirculation loops, and FIGS. 2 and 4 which comprise the second closed recirculation loop. In the embodiment shown in FIGS. 1 and 3 typical regeneration temperatures at the regeneration side of the wheels 200/210 is around 60-90° C. In FIG. 2, the regeneration temperature on the regenerate side 211 has a low temperature wheel 210 is around 45-55° C. In FIG. 4, the temperature on the regeneration side 201 of the low temperature wheel 200 is around 45-65° C.

As with the previous embodiments, higher moisture removal of the process air is accomplished by passing the process air 500 through the process side 202, 102 two desiccant wheels. Hence lower end temperatures would be obtained. Similar to the embodiment of FIG. 2, however, one of the low temperature wheels has an open loop regeneration side thereby wasting some heat.

Additional heat exchange may be provided by heat exchanger 610 between the primary process air stream 502 and input regeneration stream 300. Again, however, this does not require external input but is an efficient and effective transfer of heat energy already within the system.

As with the embodiments of FIG. 1-3, sections/elements purge line 105 may be provided to the desiccant wheels.

It can be seen that there are significant energy efficiency obtained by the dual thermodynamic and fluid coupling of the desiccant wheels/rotors 100/200. This arrangement is neither disclosed nor suggested by the prior art which either operates in open loop format or single desiccant contact structures.

Typical uses of the present invention would be air conditioning applications, humidity removal applications or even drying applications.

As will be clear to persons skilled in the art, in air conditioning applications, the process will be used to supply air which is cooler and drier than ambient or the condition space.

The embodiments shown may also be used for humidity removal applications in which the removal of moisture from the space is designed in order to create drier conditions for example in the storage of products such as food etc. As will be clear to persons skilled in the art, other applications for low humidity may also arise for instance clean rooms and equipment rooms etc.

In drying applications, there may be some energy impacts in using the proposed embodiments. Generally for rapid drying applications, a warm/hot and dry stream is applied directly to a product surface or the space around the product. This would be typical in an industrial application and differs from a humidity removal application in regard to speed and temperature of the incoming stream.

The first embodiment would be particularly useful for a humidity reduction application. The applicant believes the present application would be more energy efficient that the prior art due to more heat utilisation and the recirculation loops.

For a rapid drying application, the first embodiment may also be used however there may be some energy impacts if additional heating of the process air stream is required.

In such an instance, an option of using the second embodiment of the invention may be suitable. It is envisaged that the second embodiment would provide drier air than the first embodiment and also prior art. Again, however, it will be clear that additional heating of the air stream may have impacts on energy usage.

The second embodiment is also suitable for humidity reduction application since the energy efficiency of this embodiment is likely to greater than the first embodiment and also the prior art known to the Applicant.

Although the invention has been described with reference to specific examples it will be appreciated by those skilled in the art that the invention may be embodied in many other forms.

The invention claimed is:

1. A method for controlling moisture content of a gaseous flow comprising:
   providing a pair of desiccant contact structures each desiccant contact structure having a process side adapted to pass through a process gaseous stream for altering moisture content of the gaseous stream, and a regeneration side adapted to pass through a regeneration gaseous stream for altering moisture content of a desiccant in said contact structure, wherein the process side of a first desiccant contact structure is fluidly connected to the regeneration side of a second desiccant contact structure with a first closed recirculation loop, or the regeneration side of the first desiccant contract structure is provided with a second closed recirculation loop, said gaseous flow being provided to the process side of the second desiccant contact structure to thereby control its moisture content.

2. A method as claimed in claim 1 wherein the process side of the first desiccant contact structure is fluidly connected to the regeneration side of the second desiccant contact structure with the first closed recirculation loop.

3. A method as claimed in claim 1 wherein the regeneration side of the first desiccant contract structure is provided with a second closed recirculation loop.

4. A method as claimed in claim 1 wherein the process side of the first desiccant contact structure is fluidly connected to the regeneration side of the second desiccant contact structure with the first closed recirculation loop and the regeneration side of the first desiccant contract structure is provided with a second closed recirculation loop.

5. A method as claimed in claim 1 wherein the second closed recirculation loop is thermodynamically coupled to the regeneration side of the second desiccant contact structure.

6. A method as claimed in claim 1, wherein said desiccant contact structures is provided by a desiccant rotor or wheel.

7. A method as claimed in claim 1 wherein said gaseous flow is provided in a first state with a first moisture content and passes through the process side of the second desiccant contact structure to be converted to a second state with a second moisture content.

8. A method as claimed in claim 1 wherein the moisture content of the gaseous flow is reduced as it passes through the process side of the second desiccant contact structure.

9. A method as claimed in claim 1 wherein the fluid in the second closed recirculation loop is superheated steam.

10. A method as claimed in claim 1 wherein the first desiccant contact structure is generally at a first temperature, the second desiccant wheel is generally at a second temperature lower than the first temperature.

11. A method as claimed in claim 1 wherein the gaseous flow provided to the process side of the second desiccant contact structure is ambient air.

12. A method as claimed in claim 1 wherein the gaseous flow provided to the process side of the second desiccant contact structure is completely or partially recirculated air from an air conditioned space.

13. A method as claimed in claim 1 wherein each of said desiccant contact structures are provided with a plurality of desiccant rotor or wheels such that the gaseous flow provided to the process side of at least one second desiccant rotor/wheel is provided from the process side of another second desiccant rotor/wheel upstream thereof and the regeneration side of at least one of said second desiccant wheels is provided with heat from the second closed recirculation loop.

14. A method as claimed in claim 1 wherein one or more of said desiccant contact structures are provided with a plurality of desiccant rotor or wheels such that the gaseous flow provided to the process side of at least one second desiccant rotor/wheel is provided from the process side of another second desiccant rotor/wheel upstream thereof and the regeneration side of said desiccant wheels are connected in series in the first closed recirculation loop..

15. A method as claimed in claim 1 wherein the first desiccant contact structure is provided with a zeolite desiccant.

16. A method as claimed in claim 1 wherein the second desiccant contact structure is provided with a silica gel or polymer based desiccant.

17. A method as claimed in claim 1 wherein the first desiccant contact structure is provided with purge segments to remove moisture build-up and/or control temperature.

18. A method as claimed in any claim 17 wherein a purge exiting a first desiccant contact structure is fed to the respective second closed recirculation loop of said first desiccant contact structure to provide heat and moist air to the second closed recirculation loop.

19. A method as claimed in any claim 18 wherein heat and/or an amount of moist air equivalent to the purge being fed to the second closed recirculation loop of said first desiccant contact structure, is removed from the second closed recirculation loop downstream thereof and fed to the regeneration side of the second desiccant contact structure.

* * * * *